(12) United States Patent
Fischer et al.

(10) Patent No.: US 10,062,223 B2
(45) Date of Patent: Aug. 28, 2018

(54) INTERMEDIARY ACCESS DEVICE FOR COMMUNICATION WITH A VEHICLE

(71) Applicant: Bayerische Motoren Werke Aktiengesellschaft, Munich (DE)

(72) Inventors: Hans-Peter Fischer, Puchheim (DE); Timothy Barrett, Langley, SC (US); Andreas Kasprzok, Spartanburg, SC (US); Keith Payne, Oxon Hill, MD (US); Johannes Michael Zahn, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 206 days.

(21) Appl. No.: 14/014,787

(22) Filed: Aug. 30, 2013

(65) Prior Publication Data

US 2015/0061828 A1 Mar. 5, 2015

(51) Int. Cl.
*B60R 25/24* (2013.01)
*G07C 9/00* (2006.01)

(52) U.S. Cl.
CPC ........ *G07C 9/00007* (2013.01); *B60R 25/245* (2013.01); *G07C 9/00309* (2013.01); *G07C 2009/00341* (2013.01); *G07C 2009/00793* (2013.01)

(58) Field of Classification Search
CPC ....... H04B 1/38; G06F 3/041; G07C 9/00007; G07C 9/00309
See application file for complete search history.

(56) References Cited

U.S. PATENT DOCUMENTS

| | | | | |
|---|---|---|---|---|
| 2005/0086493 | A1* | 4/2005 | Ishidoshiro | 713/182 |
| 2009/0096576 | A1* | 4/2009 | Oman et al. | 340/5.62 |
| 2009/0312012 | A1* | 12/2009 | Tieman et al. | 455/426.1 |
| 2010/0191403 | A1* | 7/2010 | Krause | 701/29 |
| 2011/0177852 | A1* | 7/2011 | Jain et al. | 455/575.8 |
| 2012/0028580 | A1* | 2/2012 | Oesterling et al. | 455/41.2 |
| 2012/0220224 | A1* | 8/2012 | Walker | 455/41.1 |
| 2013/0106750 | A1* | 5/2013 | Kurosawa | G06F 9/4445 345/173 |

\* cited by examiner

*Primary Examiner* — Joseph Feild
*Assistant Examiner* — Pameshanand Mahase
(74) *Attorney, Agent, or Firm* — Crowell & Moring LLP (57) ABSTRACT

An intermediary access device enables a user electronic device to communicate with a vehicle's onboard computer system. A first wireless transceiver of the intermediary access device is used to establish a secure wireless communication channel between the intermediary access device and a vehicle on-board computer system. A second wireless transceiver of the intermediary access device is used to establish a user-initiated communication channel between the intermediary access device and a user electronic device. User commands and vehicle information can then be transmitted between the vehicle on-board computer system and the user electronic device via the intermediary access device in a safe, secure and efficient manner.

20 Claims, 8 Drawing Sheets

FIG. 1

Prior Art

INTERMEDIARY ACCESS DEVICE FOR COMMUNICATION WITH A VEHICLE

FIELD OF THE INVENTION

The present invention relates generally to an intermediary access device for communication with a vehicle, and more particularly to intermediary device which eliminates the need to carry around a dedicated component for vehicle access and/or to enable third party systems and applications to access and issue commands to a vehicle's on-board system in a safe, secure and efficient manner.

BACKGROUND OF THE INVENTION

Many of today's vehicles are equipped with a keyless entry system in the form of an electronic locking device that controls access to the vehicle without using a traditional mechanical key. The term remote keyless system (RKS), also called keyless entry, refers to a lock that uses an electronic remote control as a key which is activated by a handheld device or automatically by proximity. An RKS performs the functions of a standard car key without physical contact. For vehicle's equipped with an RKS, a vehicle transceiver system can detect the approach of an authorizing device carried by the vehicle's owner, such as a key fob transponder, authenticate the fob as authorized to access and operate the vehicle, and then command certain vehicle functions, such as remote locking or unlocking the doors, starting the vehicle's engine, rolling the windows down or up, opening or closing a sunroof, opening or closing a convertible top, etc.

Typical RKS key fobs contain a short-range radio transmitter that must be within a certain range (e.g., 5-20 meters (15-60 ft)) of the car to work. When a button is pushed on an active RKS key fob, a coded signal is transmitted by radio waves to a receiver unit in the vehicle. The vehicle's RKS may then issue one or more commands (open, close, lock, unlock, etc.) through the vehicle's on-board computer system, and to the particular vehicular component to be operated, based on the received coded signal. Some RKS key fobs, which are sometimes referred to as "smart keys," transmit a continual or sustained coded signal and do not require the operator to affirmatively actuate the RKS key fob in order for the vehicle to operate the various vehicle's components.

Vehicle manufacturers are very concerned with vehicle security, not only with respect to limiting access to the vehicle's passenger compartment, but also with respect to limiting communication access to the vehicle's on-board systems. As a result, RKS key fobs are typically designed to emit a radio frequency with a designated, distinct digital identity code. Such RKS key fobs are generally programmable only by the vehicle's manufacturer, and all wireless communications between the key fob and the vehicle's on-board is typically encrypted.

While there have been substantial improvements in vehicle key technology, moving from a mechanical-based key to an electronic-based key, there is still a need for the driver to carry around and keep track of an additional component for vehicle access. Moreover, vehicle's are generally considered closed systems with no third party access permitted to the vehicle's on-board systems. And communications with vehicle on-board systems, particularly those which involve the issuance of commands to operate any of the vehicle's components, have been limited to either the use of a manufacturer-provided device, such as an RKS key fob, or via a secure backend server-based system that is controlled by the manufacturer. Thus, the ability of third parties to develop systems and applications which interact with the vehicle has been limited to having to communicate with a remote backend-server that is controlled by the vehicle manufacturer, which in turn then communicates with the vehicle's onboard system. However, there are many drawbacks associated with this solution, including that it requires the vehicle to be in an area with adequate signal reception, which may not be available when the vehicle is in a parking structure, tunnel or remote area. This solution is also highly resource intensive since all communications with the vehicles must be routed through the manufacturer's backend-server system.

Therefore, what is needed is an intermediary device which eliminates the need to carry around an additional device dedicated to vehicle access and/or to enable third party systems and applications to access and issue commands to a vehicle's on-board system in a safe, secure and efficient manner.

SUMMARY OF THE INVENTION

Disclosed and claimed herein are an intermediary access device for a motor or electric vehicle and a method for using the same. The intermediary device has a memory configured to store security-related information that is user-inaccessible. The intermediary device includes a first wireless transceiver configured to establish a secure wireless communication channel between the intermediary access device and a vehicle on-board computer system using the security-related information, and also has a second wireless transceiver configured to establish a user-initiated communication channel between the intermediary access device and a user electronic device. The intermediary device further includes a controller, coupled to the memory, the first wireless transceiver and the second wireless transceiver. The controller is configured to control the second wireless transceiver to receive a user command from the user electronic device over the user-initiated communication channel, and to further control the first wireless transceiver to transmit the user command to the vehicle on-board computer system over the secure wireless communication channel.

The invention further comprises a method for communicating with a vehicle using an intermediary access device. The method includes establishing, by a first wireless transceiver of the intermediary access device, a secure wireless communication channel between the intermediary access device and a vehicle on-board computer system using user-inaccessible security-related information stored in a memory of the intermediary access device. The method also includes establishing, by a second wireless transceiver of the intermediary access device, a user-initiated communication channel between the intermediary access device and a user electronic device. A user command is received, by the second wireless transceiver, from the user electronic device over the user-initiated communication channel. And finally, the user command is transmitted, by the first wireless transceiver, to the vehicle on-board computer system over the secure wireless communication channel, wherein the user command is configured to cause the vehicle on-board computer system to perform a vehicle operation.

Other aspects, features, and techniques of the invention will be apparent to one skilled in the relevant art in view of the following description of the exemplary embodiments of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE EXEMPLARY EMBODIMENTS

One aspect of the invention is to provide an intermediary device which eliminates the need to carry around a dedicated component for vehicle access, such as an RKS fob key. Another aspect of the invention is to enable third party systems and applications to access and issue commands to a vehicle's on-board system in a safe, secure and efficient manner. As will be described in detail below, the intermediary access device disclosed herein uses a first wireless transceiver to establish a secure wireless communication channel between the intermediary access device and a vehicle on-board computer system. A second wireless transceiver of the intermediary access device is used to establish a user-initiated communication channel between the intermediary access device and a user electronic device. User commands and vehicle information can then be transmitted between the vehicle on-board computer system and the user electronic device via the intermediary access device in a safe, secure and efficient manner.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium or transmitted by a computer data signal. The "processor readable medium" may include any medium that can store information. Examples of the processor readable medium include an electronic circuit, a semiconductor memory device, a ROM, a flash memory or other non-volatile memory, a floppy diskette, a CD-ROM, an optical disk, a hard disk, etc.

The term "back-end server" means a functionally-related group of electrical components, such as a computer system in a networked environment which may include both hardware and software components, or alternatively only the software components that, when executed, carry out certain functions. The "backend server" may be further integrated with a database management system and one or more associated databases.

Figure 1:
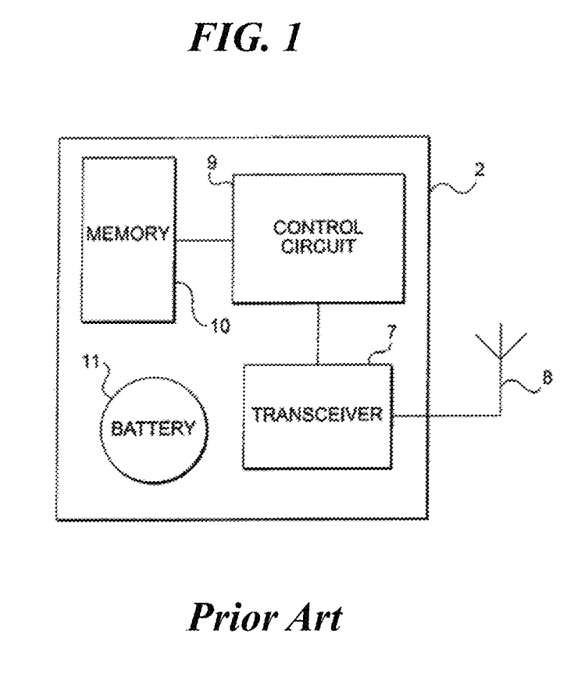
FIG. 1 is a simplified schematic illustrating a prior art RKS fob key device.

FIG. 1 depicts a prior art RKS fob key device 2 having an RF transceiver 7 and antenna 8 that provides the key device 2 with the ability to transmit information, such has control commands, to a vehicle receiver (not shown). Transceiver 7 may also receive signals from the vehicle, including, for example, vehicle-specific authorization codes, access verification queries from the vehicle, and other data transmissions. The transceiver 7 is controlled by a micro-electronic control circuit 9. The control circuit 9, such as a control processor, is programmed to manage the flow of information and commands to or from transceiver 7, and to store and retrieve data maintained in a module memory 10. Control circuit 9 responds to operation of control buttons (not shown) and to external signals received via transceiver 7, such as a vehicle's request for confirmation of access authorization. The electronics in key device 2 are powered by a conventional "coin-format" miniature battery 11.

Figure 2:
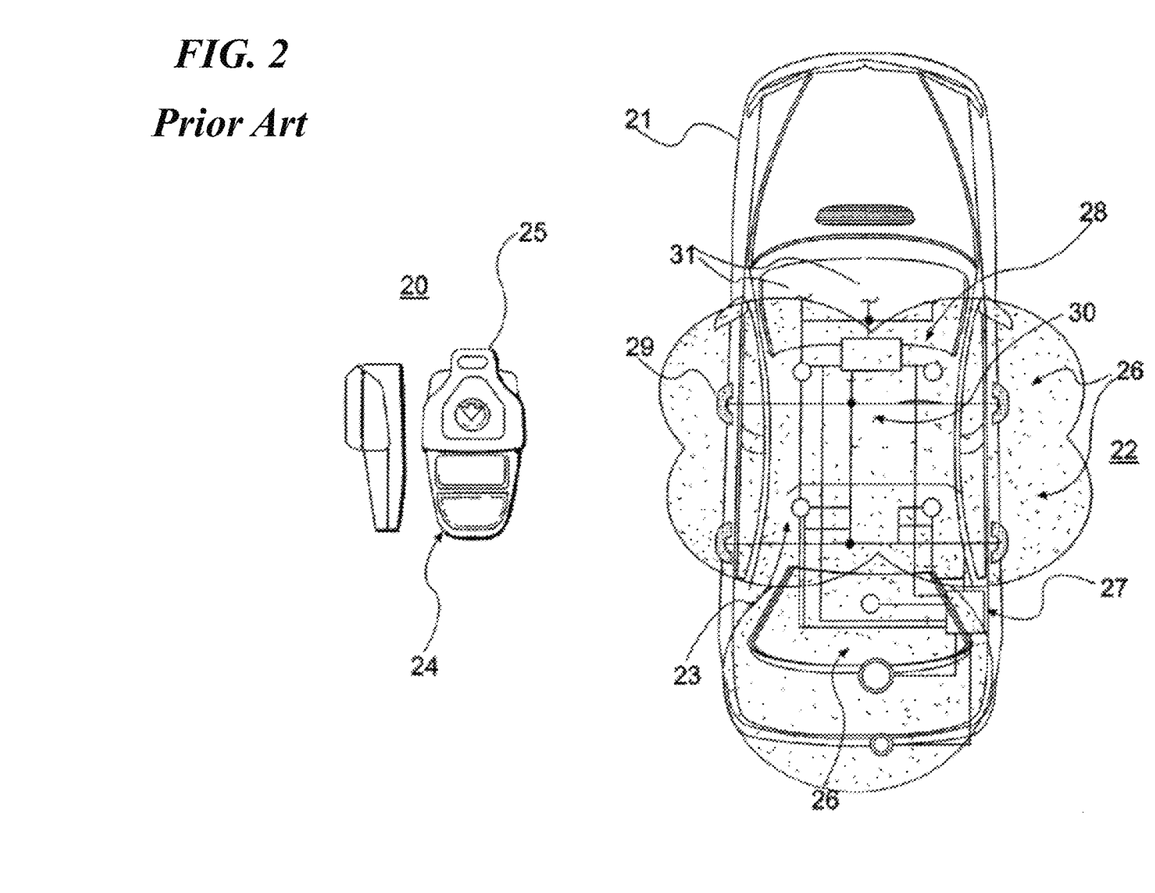
FIG. 2 illustrates a prior art system RKS system.

FIG. 2 illustrates a prior art RKS fob key device 20, such as the RKS fob key device 2 described above with reference to FIG. 1, which is provided with a vehicle 21 equipped with a variety of electronic devices, including vehicle access and operation authorization systems. A vehicle access system 22 enables keyless entry to the vehicle and keyless authorization to operate the vehicle. In this embodiment, access system 22 is an integrated electronic access control system that uses multiple antennas 23, distributed and integrated into various parts of the vehicle, to exchange vehicle access and authorization signals and other information with key device module 24 and data storage module 25. The access system 22 may correspond to the "Comfort Access" system developed and marketed by the assignee hereof.

The reception range 26 of each antenna disposed about the vehicle is limited, allowing differentiation between multiple modular key devices within range. Signals to and from the array of antennas 23 are processed by an access point 27, which in turn communicates with the vehicle's access system controller 28. One function of the vehicle controller 28, already known in the art, is to determine whether an access request received by the controller is an authorized access request, and if so, to command the unlocking of door locks 29 via a vehicle lock control network 30.

The vehicle access system controller 28 in the "Comfort Access" system is also linked to a central communications network with branches 31 to other vehicle equipment (not shown), such as seat position controllers, navigation systems and cellular telephone systems which may contain personal data, including personal settings for the vehicle equipment and other data such as telephone numbers stored in a cellular telephone system memory. The vehicle controller 28 communicates with other vehicle components over the network branches 31.

Exemplary Embodiments

As noted above, one aspect of the invention is to provide an intermediary device which eliminates the need to carry around a dedicated component for vehicle access, such as the RKS fob key device 20. Another aspect of the invention is further to enable third party systems and applications to access and issue commands to a vehicle's on-board system in a safe, secure and efficient manner.

Figure 3:
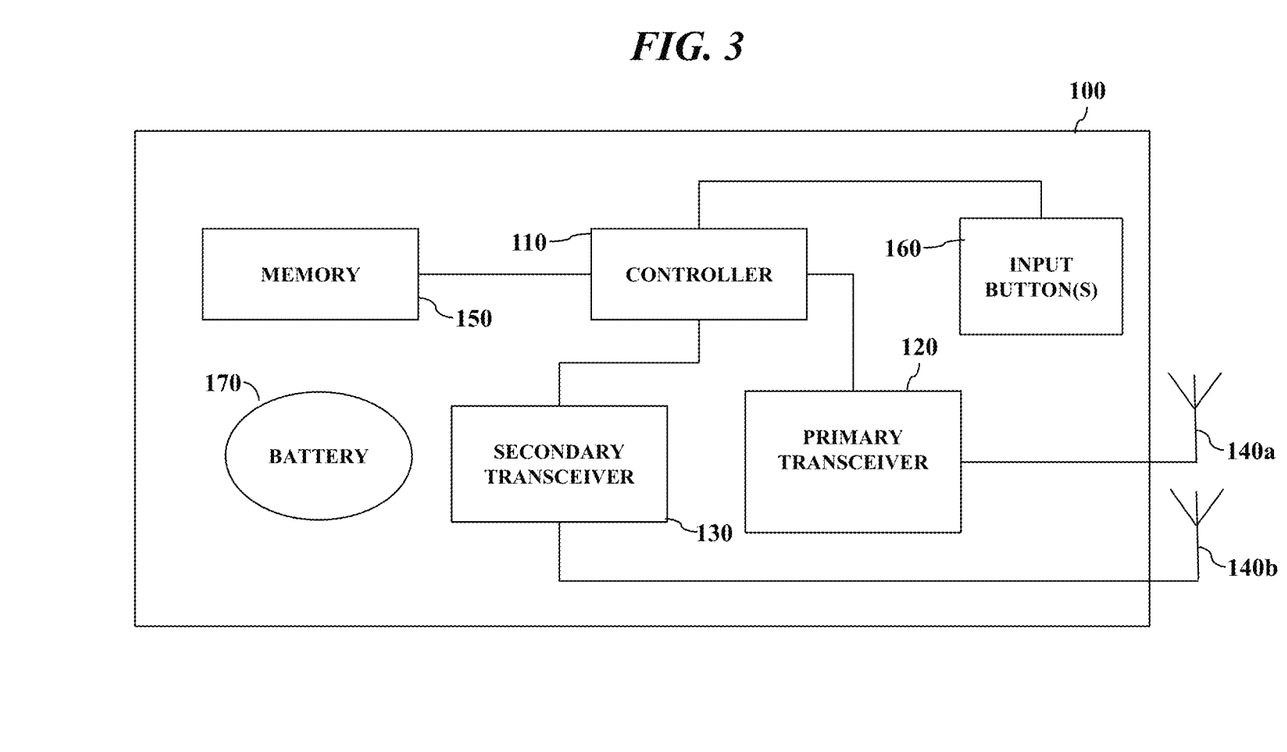
FIG. 3 is a simplified schematic illustrating an intermediary access device configured in accordance with the principles of the invention.

To that end, FIG. 3 depicts a simplified schematic of an intermediary access device 100 configured in accordance with the principles of the invention. In order to eliminate the need for a vehicle operator to carry around a dedicated access device, such as the RKS fob key device 20, it should be appreciated that the intermediary access device 100 may be embodied in a personal accessory by integrating its circuitry into the personal accessory component, such as in a wrist watch, pen, cellular telephone case, key chain, credit card, money clip, etc.

As shown in FIG. 3, the intermediary access device 100 is configured with a controller 110, which may comprise one or more processors or microcontrollers. The controller 110 is electrically coupled to at least a primary transceiver 120, as well as being further coupled to a secondary transceiver 130. In one embodiment, one or both of the primary transceiver 120 and secondary transceiver 130 may be a radio frequency (RF) transceiver having an associated antenna 140a and/or 140b, respectively. Alternatively, the primary transceiver 120 may be an RF transceiver, while the secondary transceiver 130 may be comprised of near field communication (NFC) or Bluetooth™ circuitry.

The transceivers 120 and 130 are controlled by the controller 110, which is programmed to manage the flow of information and/or commands to or from the transceivers 120 and 130, and to store and retrieve data maintained in a memory 150, which may be comprised of a non-volatile memory (e.g., flash memory). Controller 110 may be programmed to respond to operation of input button(s) 160, as well as to external signals received via transceivers 120 and 130, such as a vehicle's request for confirmation of access authorization. Additionally, controller 110 may be programmed to respond to external wireless signals received by transceivers 120 and 130 from one or more external wireless devices, such as a smartphone or similar wireless consumer electronic device, as will be described in more detail below. The intermediary access device 100 may be powered by a conventional "coin-format" miniature battery 170, or any other known means of powering such circuitry.

In certain embodiments, the primary transceiver 120 and antenna 140a are used to provide the intermediary access device 100 with the ability to transmit information, such as control commands, to a vehicle receiver (not shown). Primary transceiver 120 may also receive signals from the vehicle or other sources, including, for example, vehicle-specific authorization codes, access verification queries from the vehicle, and other data transmissions. The present invention is not limited to RF communications technology for communicating with the vehicle, but instead may employ any suitable transceiver technology, such as an IR (infrared) transceiver, or any combination of such transceivers, which provides the necessary communications functionality.

Since communications directly with the on-board system of the vehicle is restricted to only manufacturer-provided authorized devices (such as the RKS fob key device 20), third party devices, such as smartphones, have not been able to communicate directly with the vehicle on-board system. However, as noted above, the secondary transceiver 130 may provide the intermediary access device 100 with the ability to transmit information between the intermediary access device 100 and external wireless devices, such as a smartphone or similar wireless consumer electronic devices. The intermediary access device 100 may then relay, in a fully secure manner and under the control of controller 110, such transmissions to and from the vehicle's on-board system via the primary transceiver 120 in the aforementioned manner.

Figure 4:
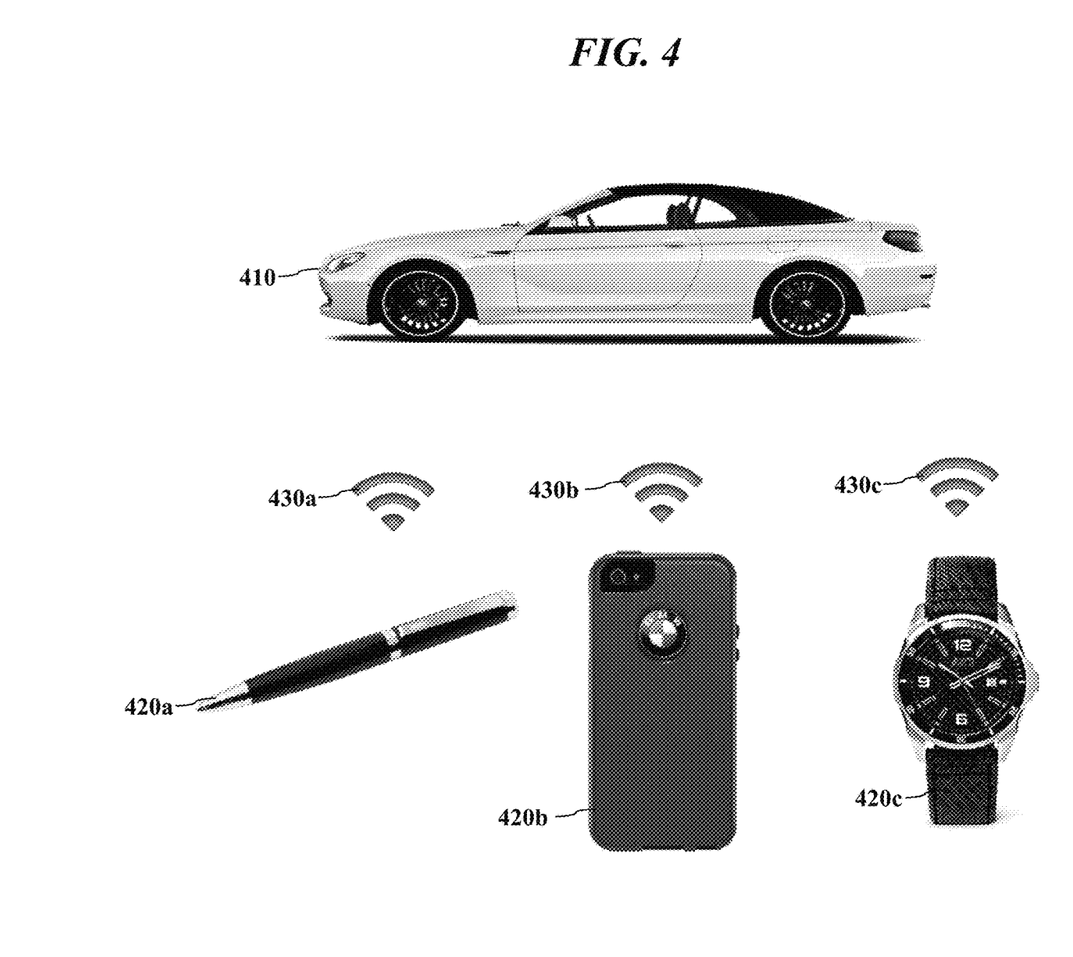
FIG. 4 shows various examples of intermediary access devices, configured in accordance with the principles of the invention, in communication with a vehicle.

FIG. 4 depicts various examples of intermediary access devices, configured in accordance with the principles of the invention, in communication with a vehicle. Specifically, vehicle 410 is equipped with a vehicle access system, such as the vehicle access system 22 described above with reference to FIG. 2, which enables it to communicate with one or more intermediary access devices 420a, 420b, 420c, (collectively, "420"). In the embodiment of FIG. 4, the intermediary access devices 420 are shown as taking the form of a pen, cellular telephone case and wrist watch, respectively. Each of the intermediary access devices 420 are configured to establish a secure, wireless RF communication channel 430a, 430b, 430c, (collectively, "430") with the vehicle's 410 access system, the process of which will be further detailed below with reference to FIGS. 6A-6B.

Figure 5A:
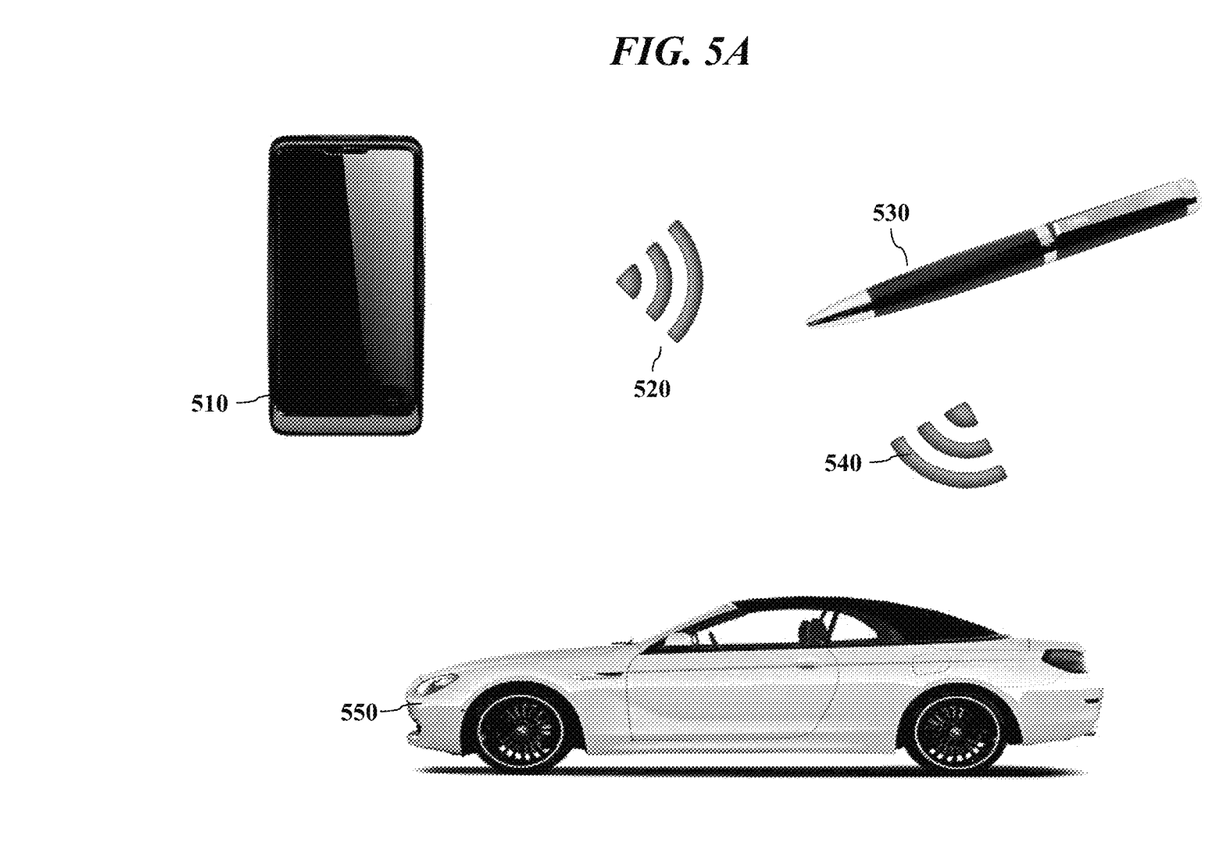
FIGS. 5A & 5B illustrate an intermediary access device in communication with a user electronic device and a vehicle, in accordance with the principles of the invention.
Figure 5B:
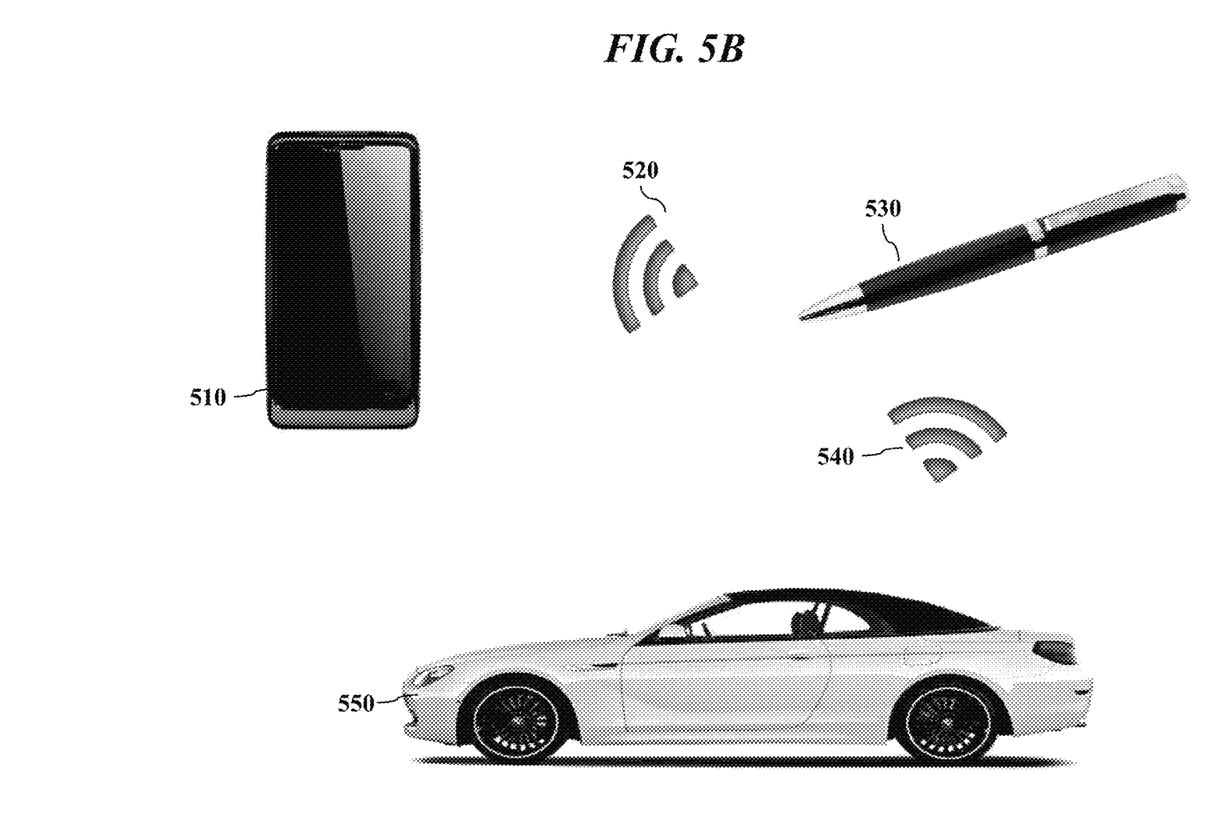

FIGS. 5A-5B depict an intermediary access device of the present invention interacting with both a user electronic device and a vehicle such that user commands can be securely sent to a vehicle using a third-party user electronic device, such as a smartphone, and vehicle information can be securely provided by the vehicle to the user electronic device. In FIG. 5A, a user electronic device 510 (e.g., smartphone) is shown as transmitting one or more user commands to the intermediary access device 530 over a user-initiated communication channel 520. User commands may be transmitted using a software application executing on the user electronic device, which is programmed to receive user inputs (e.g., by tapping a touchscreen of the device) which correspond to a particular vehicle operation that the user desires be performed. The intermediary access device 530 then relays corresponding command(s) to the vehicle 550 after it has established a separate, secure wireless communication channel 540 with the vehicle 550. FIG. 5B, on the other hand, depicts the vehicle 550 as transmitting vehicle information over the secure wireless communication channel 540 to the intermediary access device 530, which may then relay the corresponding information to the user electronic device 510 over the user-initiated communication channel 520. While the intermediary access device is depicted in FIGS. 5A-5B as being integrated into a pen, it should be appreciated that the intermediary access device may be integrated into virtually any personal accessory having sufficient dimensions to accommodate the device's circuitry.

Figure 6A:
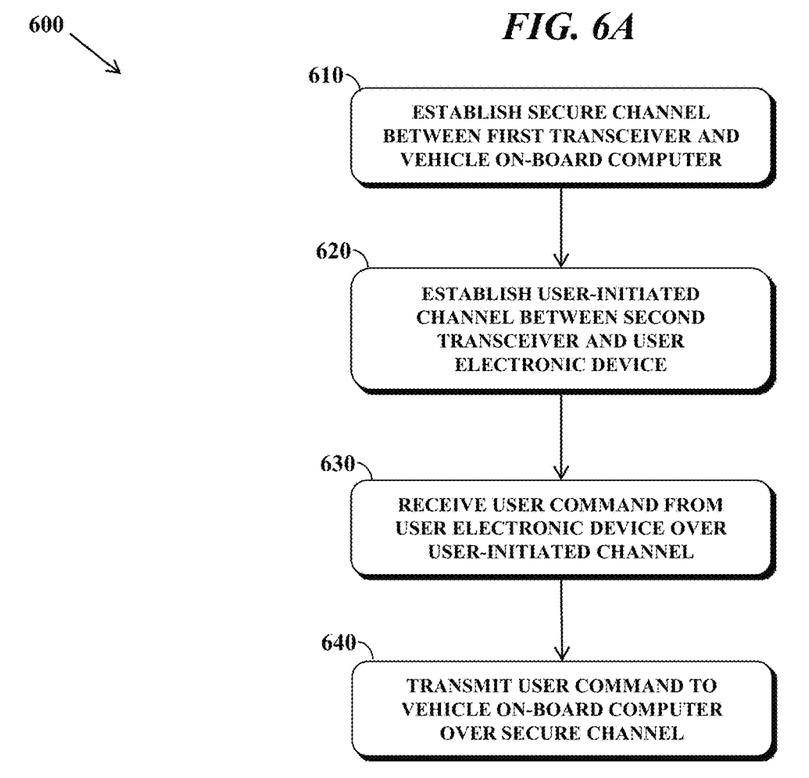
FIGS. 6A & 6B is a flow diagram for one embodiment of a process for using an intermediary access device in accordance with the principles of the invention.
Figure 6B:
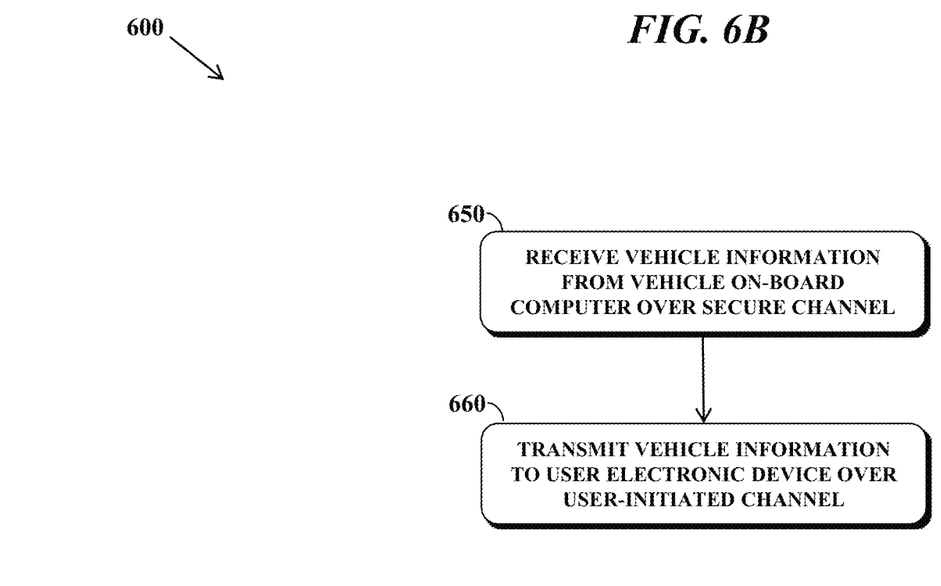

The process by which the various communications depicted in FIGS. 5A-5B can be achieved will now be described in further detail with reference to FIGS. 6A-6B. In particular, FIGS. 6A-6B illustrate a process for using an intermediary access device in accordance with the principles of the invention, where the operations shown in FIG. 6A correspond to arrangement described above with reference to FIG. 5A, and where the operations shown in FIG. 6B correspond to arrangement described above with reference to FIG. 5B.

Process 600 begins at block 610 with establishing a secure wireless communication channel between the intermediary access device (e.g., intermediary access device 100 of FIG. 3) and a vehicle's on-board computer system. In certain embodiments, a wireless transceiver (e.g., primary transceiver 120 of FIG. 3) of the intermediary access device, under the direction of a controller (e.g., controller 110 of FIG. 3) may be used to carrying out the operation of block 610.

Moreover, since communications directly with the on-board system of the vehicle is restricted to only manufacturer-provided authorized devices (such as the RKS fob key device 20), certain predetermined security-related information may be stored in a memory of the intermediary access device (e.g., memory 150 of FIG. 3) and used to establish the secure wireless communication channel with the vehicle. The security-related information should preferably be inaccessible to the user so as to ensure that communication with the vehicle is secure and that access to its on-board systems cannot be compromised. In certain embodiments, the security-related information may comprise one or more security codes that uniquely identify the intermediary access device, which can be transmitted to and used by the vehicle's onboard computer system to authenticate the particular intermediary access device as being an authorized device. The particular manner of authentication may follow any known methodology. Alternatively, the security-related information may comprise a rolling code algorithm from which one or more security codes that uniquely identify the intermediary access device are generated. The generated code(s) may then similarly be transmitted to and used by the vehicle's onboard computer system to authenticate the particular intermediary access device as being an authorized device.

Process 600 further comprises establishing a user-initiated communication channel between the intermediary access device and a user electronic device, such as a smartphone (block 620). In certain embodiments, an additional wireless transceiver (e.g., secondary transceiver 130 of FIG. 3) of the intermediary access device, under the direction of a controller (e.g., controller 110 of FIG. 3) may be used for carrying out the operation of block 620. Moreover, the intermediary access device may be configured with an application programming interface (API) which may be used by a software application, executing on the user electronic device, to carry out the operation of block 620 and to generally interact with the intermediary access device. The process by which software applications, such as a mobile application executing on a smartphone-type device, can communicate with another device via an API is well known and therefore will not be described in detail herein. However, it should be appreciated that the user-initiated communication channel established at block 620 may follow the Bluetooth™ protocol, or a similar communication protocol based on a pairing operation occurring between the intermediary access device and the user electronic device. In another embodiment, the user-initiated communication channel may be an NFC-type channel.

It should further be appreciated that the communication channel to be established at block 620 is user-initiated in that the channel is established in response to a user request or some particular user action, such as indicating that the user electronic device should attempt to automatically connect/pair with the intermediary access device when in range.

Continuing to refer to FIG. 6, once both the communication channels of blocks 610 and 620 have been established, process 600 may then continue to block 630 where the intermediary access device may receive a user command from the user electronic device over the user-initiated communication channel. While such a user command may correspond to virtually any operation that the vehicle is capable of performing, examples of possible user commands include without limitation a door lock/unlock command, a window open/close command, a roof open/close command and a trunk open command. The command may be provided by the user using a software application executing on the intermediary access device, such as by selecting a desired vehicle command by tapping a touchscreen of the user electronic device.

From there, process 600 may continue to block 640 where the intermediary access device may then transmit the user command (e.g., using primary transceiver 120 of FIG. 3) to the vehicle on-board computer system over the secure wireless communication channel. It should be appreciated that the user command, as it is received by the intermediary access device from the user electronic device, may be first evaluated by the intermediary access device to determine if it is a valid and authorized command, and then may be processed and formatted into a signal form that can be recognized and acted on by the vehicle's on-board computer system.

Referring now to FIG. 6B, further operations of process 600, corresponding to the arrangement of FIG. 5B, are provided for using an intermediary access device in accordance with the principles of the invention. In particular, at block 650 process further includes receiving (e.g., via the primary transceiver 120), vehicle information from the vehicle on-board computer system over the secure wireless communication channel. While such vehicle information may include virtually any information that the vehicle is capable of providing, examples of possible vehicle information include, without limitation, vehicle fuel level, tire pressure, average fuel consumption and vehicle mileage.

Following the operation of block 650, process 600 may then continue to block 660 where the vehicle information (or data representative of such information) can then be transmitted by the intermediary access device (e.g., via the secondary transceiver 120) to the user electronic device over the user-initiated communication channel. It should be appreciated that, as with the user commands described above, the intermediary access device may first process and/or format the vehicle information received from the vehicle into a signal form that can be recognized and parsed by a software application executing on the user electronic device.

In the above manner, and intermediary access device, and method for using the same, is provided which eliminates the need to carry around a dedicated component for vehicle access and/or to enable third party systems and applications to access and issue commands to a vehicle's on-board system in a safe, secure and efficient manner which overcomes the drawbacks of the prior art approach of relying on a remote backend-server controlled by the vehicle manufacturer. The intermediary access device may also be used as an authentication tool, or in connection with an authentication methodology, for external services, e.g., "My BMW Remote" mobile phone application.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A non-dedicated intermediary access device for communicating with a vehicle and configured as a personal accessory, the device comprising:
   a memory housed within a case that is portable from the vehicle, the memory configured to store security-related information that is user-inaccessible;
   a first wireless transceiver housed within the case, the first wireless transceiver configured to establish a secure wireless communication channel between the non-dedicated intermediary access device and a vehicle on-board computer system using the security-related information;
   a second wireless transceiver housed within the case, the second wireless transceiver configured to establish a user-initiated communication channel between the non-dedicated intermediary access device and a user electronic device that does not have access to the security-related information; and
   a controller housed within the case and coupled to the memory, the first wireless transceiver and the second wireless transceiver, the controller configured to:
      (i) control the second wireless transceiver to receive a user command from the user electronic device over the user-initiated communication channel, and
      (ii) control the first wireless transceiver to transmit the received user command to the vehicle on-board computer system over the secure wireless communication channel;
   wherein user commands are not transmittable to the vehicle on-board computer system except via secure wireless communication channels established using the security-related information.

2. The non-dedicated intermediary access device of claim 1,
   wherein the security-related information comprises one or more security codes that uniquely identify the non-dedicated intermediary access device, and
   wherein the first wireless transceiver is configured to establish the secure wireless communication channel between the non-dedicated intermediary access device and the vehicle on-board computer system by transmitting the one or more security codes to the vehicle on-board computer system.

3. The non-dedicated intermediary access device of claim 2,
   wherein the security-related information comprises a rolling code algorithm from which said one or more security codes that uniquely identify the non-dedicated intermediary access device are generated, and
   wherein the first wireless transceiver is configured to establish the secure wireless communication channel between the non-dedicated intermediary access device and the vehicle on-board computer system by transmitting the one or more security codes to the vehicle on-board computer system.

4. The non-dedicated intermediary access device of claim 1, wherein the user command comprises one of a door lock/unlock command, a window open/close command, a roof open/close command and a trunk open command.

5. The non-dedicated intermediary access device of claim 1, wherein the memory is further configured to store vehicle information.

6. The non-dedicated intermediary access device of claim 1, wherein the controller is further configured to control the first wireless transceiver to receive vehicle information from the vehicle on-board computer system over the secure wireless communication channel, and to control the second wireless transceiver to transmit the vehicle information to the user electronic device over the user-initiated communication channel.

7. The non-dedicated intermediary access device of claim 1, wherein the vehicle information comprises at least one of vehicle fuel level, tire pressure, average fuel consumption and vehicle mileage.

8. The non-dedicated intermediary access device of claim 1, wherein the personal accessory comprises one of a wrist watch, pen, cellular telephone case, key chain, credit card and money clip.

9. The non-dedicated intermediary access device of claim 1, wherein the user-initiated communication channel is one of a near field communication channel and a Bluetooth communication channel.

10. The non-dedicated intermediary access device of claim 1, wherein the second wireless transceiver is configured to establish the user-initiated communication channel in response to a pairing operation between the non-dedicated intermediary access device and the user electronic device.

11. A method for communicating with a vehicle using a non-dedicated intermediary access device configured as a personal accessory, the method comprising the acts of:
   establishing, by a first wireless transceiver housed within a casing of the non-dedicated intermediary access device that is portable from the vehicle, a secure wireless communication channel between the non-dedicated intermediary access device and a vehicle on-board computer system using user-inaccessible security-related information stored in a memory housed within the casing of the non-dedicated intermediary access device;
   establishing, by a second wireless transceiver housed within the casing of the non-dedicated intermediary access device, a user-initiated communication channel between the non-dedicated intermediary access device and a user electronic device that does not have access to the security-related information;
   receiving, by the second wireless transceiver, a user command from the user electronic device over the user-initiated communication channel; and
   transmitting, by the first wireless transceiver, the user command to the vehicle on-board computer system over the secure wireless communication channel,
   wherein the user command is configured to cause the vehicle on-board computer system to perform a vehicle operation, and is not transmittable to the vehicle on-board computer system except via secure wireless communication channels established using the security-related information.

12. The method of claim 11, wherein the security-related information comprises one or more security codes that uniquely identify the non-dedicated intermediary access device, and wherein establishing, by the first wireless transceiver, the secure wireless communication channel comprises establishing, by the first wireless transceiver, the secure wireless communication channel by transmitting the one or more security codes to the vehicle on-board computer system.

13. The method of claim 11, wherein the security-related information comprises a rolling code algorithm from which said one or more security codes that uniquely identify the non-dedicated intermediary access device are generated, and wherein establishing, by the first wireless transceiver, the secure wireless communication channel comprises establishing, by the first wireless transceiver, the secure wireless communication channel by generating the one or more security codes using the rolling code algorithm, and transmitting the one or more security codes to the vehicle on-board computer system.

14. The method of claim 11, wherein the user command comprises one of a door lock/unlock command, a window open/close command, a roof open/close command and a trunk open command.

15. The method of claim 11, further comprising storing vehicle information that is user-inaccessible in the memory of the intermediary access device.

16. The method of claim 11, further comprising:
receiving, by the first wireless transceiver, vehicle information from the vehicle on-board computer system over the secure wireless communication channel; and
transmitting, by the second wireless transceiver, the vehicle information to the user electronic device over the user-initiated communication channel.

17. The method of claim 11, wherein the vehicle information comprises at least one of vehicle fuel level, tire pressure, average fuel consumption and vehicle mileage.

18. The method of claim 11, wherein the personal accessory comprises one of a wrist watch, pen, cellular telephone case, key chain, credit card and money clip.

19. The method of claim 11, wherein the user-initiated communication channel is one of a near field communication channel and a Bluetooth communication channel.

20. The method of claim 11, wherein establishing, by the second wireless transceiver, the user-initiated communication channel comprises performing a pairing operation between the non-dedicated intermediary access device and the user electronic device.

* * * * *